(12) United States Patent
Gmuender et al.

(10) Patent No.: US 10,970,144 B2
(45) Date of Patent: Apr. 6, 2021

(54) PACKET PROCESSING ON A MULTI-CORE PROCESSOR

(71) Applicant: SONICWALL US HOLDINGS INC., Milpitas, CA (US)

(72) Inventors: John E. Gmuender, Sunnyvale, CA (US); Iosif Harutyunov, Cupertino, CA (US); Manish Mathur, Sunnyvale, CA (US); Ilya Minkin, Los Altos, CA (US); Huy Minh Nguyen, Fountain Valley, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 16/667,496

(22) Filed: Oct. 29, 2019

(65) Prior Publication Data

US 2020/0142760 A1 May 7, 2020

Related U.S. Application Data

(63) Continuation of application No. 15/900,706, filed on Feb. 20, 2018, now Pat. No. 10,459,777, which is a
(Continued)

(51) Int. Cl.
*H04L 12/773* (2013.01)
*G06F 9/54* (2006.01)
(Continued)

(52) U.S. Cl.
CPC .............. *G06F 9/546* (2013.01); *G06F 9/466* (2013.01); *G06F 9/4881* (2013.01); *G06F 9/5044* (2013.01); *H04L 45/60* (2013.01)

(58) Field of Classification Search
CPC ........ G06F 9/546; G06F 9/466; G06F 9/4881; G06F 9/5044; H04L 45/60;
(Continued)

(56) References Cited

U.S. PATENT DOCUMENTS 6,453,360 B1 * 9/2002 Muller .................... H04L 29/06
370/235
6,675,221 B1 1/2004 Basso et al.
(Continued)

OTHER PUBLICATIONS

U.S. Appl. No. 12/240,892, Office Action dated Nov. 24, 2010.
(Continued)

*Primary Examiner* — Mohamed A Kamara
(74) *Attorney, Agent, or Firm* — Polsinelli LLP (57) ABSTRACT

A method for packet processing on a multi-core processor. According to one embodiment of the invention, a first set of one or more processing cores are configured to include the capability to process packets belonging to a first set of one or more packet types, and a second set of one or more processing cores are configured to include the capability to process packets belonging to a second set of one or more packet types, where the second set of packet types is a subset of the first set of packet types. Packets belonging to the first set of packet types are processed at a processing core of either the first or second set of processing cores. Packets belonging to the second set of packet types are processed at a processing core of the first set of processing cores.

20 Claims, 7 Drawing Sheets

Related U.S. Application Data continuation of application No. 15/397,363, filed on Jan. 3, 2017, now Pat. No. 9,898,356, which is a continuation of application No. 14/818,218, filed on Aug. 4, 2015, now Pat. No. 9,535,773, which is a continuation of application No. 14/079,308, filed on Nov. 13, 2013, now Pat. No. 9,098,330, which is a continuation of application No. 13/196,454, filed on Aug. 2, 2011, now Pat. No. 8,594,131, which is a continuation of application No. 12/240,892, filed on Sep. 29, 2008, now Pat. No. 7,990,974.

(51) Int. Cl.
*G06F 9/50* (2006.01)
*G06F 9/48* (2006.01)
*G06F 9/46* (2006.01)

(58) Field of Classification Search
CPC ............ H04L 47/2441; H04L 47/2483; H04L 47/624; H04L 47/627
See application file for complete search history.

(56) References Cited

U.S. PATENT DOCUMENTS

| | | |
|---|---|---|
| 7,634,776 B2 | 12/2009 | Parameswaran et al. |
| 7,664,823 B1 | 2/2010 | Wakerly |
| 7,702,896 B1 | 4/2010 | Polyudov |
| 7,990,974 B1 | 8/2011 | Gmuender et al. |
| 8,584,126 B2 | 11/2013 | Ang et al. |
| 8,594,131 B1 | 11/2013 | Gmuender |
| 9,098,330 B2 | 8/2015 | Gmuender |
| 9,535,773 B2 * | 1/2017 | Gmuender ............ G06F 9/546 |
| 9,898,356 B2 | 2/2018 | Gmuender |
| 10,459,777 B2 | 10/2019 | Gmuender |
| 2003/0120877 A1 | 6/2003 | Jahnke |
| 2003/0235194 A1 | 12/2003 | Morrison |
| 2004/0028044 A1 | 2/2004 | Hooper |
| 2004/0088651 A1 | 5/2004 | McKnight et al. |
| 2005/0100017 A1 | 5/2005 | Williams et al. |
| 2006/0056406 A1 | 3/2006 | Bouchard et al. |
| 2006/0179156 A1 | 8/2006 | Etherton et al. |
| 2007/0014240 A1 | 1/2007 | Kumar et al. |
| 2008/0127198 A1 | 5/2008 | Cometto et al. |
| 2008/0181245 A1 | 7/2008 | Basso et al. |
| 2009/0070602 A1 | 3/2009 | Ingle et al. |
| 2009/0109974 A1 | 4/2009 | Shetty et al. |
| 2009/0285228 A1 * | 11/2009 | Bagepalli ............... H04L 45/42 370/412 |
| 2010/0169636 A1 | 7/2010 | Davis et al. |
| 2011/0022672 A1 * | 1/2011 | Chang .................. G06Q 10/08 709/206 |
| 2014/0068622 A1 | 3/2014 | Gmuender |
| 2016/0026516 A1 | 1/2016 | Gmuender |
| 2017/0116057 A1 | 4/2017 | Gmuender |
| 2018/0181453 A1 | 6/2018 | Gmuender |

OTHER PUBLICATIONS

U.S. Appl. No. 13/196,454, Office Action dated May 21, 2013.
U.S. Appl. No. 14/079,308, Office Action dated Nov. 6, 2014.
U.S. Appl. No. 14/818,218, Office Action dated Apr. 29, 2017.
U.S. Appl. No. 15/397,363, Office Action dated Jun. 1, 2017.
U.S. Appl. No. 15/900,706, Office Action dated Feb. 21, 2019.

* cited by examiner

PACKET PROCESSING ON A MULTI-CORE PROCESSOR

CROSS-REFERENCE TO RELATED APPLICATIONS

The present application is a continuation and claims the priority benefit of U.S. patent application Ser. No. 15/900,706 filed Feb. 20, 2018, now U.S. Pat. No. 10,459,777, which is a continuation and claims the priority benefit of U.S. patent application Ser. No. 15/397,363 filed Jan. 3, 2017, now U.S. Pat. No. 9,898,356, which is a continuation and claims the priority benefit of Ser. No. 14/818,218 filed Aug. 4, 2015, now U.S. Pat. No. 9,535,773, which is a continuation and claims the priority benefit of U.S. patent application Ser. No. 14/079,308 filed Nov. 13, 2013, now U.S. Pat. No. 9,098,330, which is a continuation and claims the priority benefit of U.S. patent application Ser. No. 13/196,454 filed Aug. 2, 2011, now U.S. Pat. No. 8,594,131, which is a continuation and claims the priority benefit of U.S. patent application Ser. No. 12/240,892 filed Sep. 29, 2008, now U.S. Pat. No. 7,990,974, the disclosures of which are incorporated herein by reference.

BACKGROUND OF THE INVENTION

Field of the Invention

Embodiments of the invention relate to the field of packet processing; and more specifically, to packet processing on a multi-core processor.

Description of the Related Art

A multi-core processor (e.g., a multi-core network processor, a multi-core general purpose processor, etc.) is a processor with two or more processing cores. Multi-core processors may increase processing performance. However, the packet processing architecture of a system is modified to realize the processing performance advantages of a multi-core processor. One packet processing architecture includes executing the same packet processing modules on each core. Thus, in this packet processing architecture, each core may process any packet.

Another packet processing architecture includes a single processing core or processor (e.g., a separate general purpose CPU) only processing "exception" packets, while the other cores only process "non-exception" packets. In this architecture, typically all packets are received by the processing cores that process the "non-exception" packets. Upon determining a packet is an "exception" packet, that packet is forwarded to the processing core or processor dedicated for processing "exception" packets.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, secure router, unified threat management (UTM) appliance (e.g., including functionality including but not limited to firewall, gateway, anti-virus, anti-spyware, intrusion detection system, intrusion prevention system, web content filtering, and/or IPsec VPN) is a piece of networking equipment, including hardware and software that communicatively interconnects other equipment on the network (e.g., other network elements, computer end stations, etc.). A secure router includes, but is not limited to, routing functionality, switching functionality and security functionality (e.g., firewall, gateway, anti-virus, anti-spyware, intrusion detection system, intrusion prevention system, web content filtering, and/or IPsec VPN, user authentication, client security posture assessment, etc.).

A method and apparatus for packet processing on a multi-core processor is described. In one embodiment of the invention, a first set of one or more processing cores are loaded with packet processing modules that include the capability of processing packets belonging to a first set of one or more packet types, and a second set of one or more processing cores are loaded with packet processing modules that include the capability of processing packets belonging to a second set of one or more packet types, the second set of packet types being a subset of the first set of packet types.

According to one embodiment of the invention, the first set of packet types includes each packet to be processed by the multi-core processor. For example, each ingress packet (including control packets, data packets, packets relating to configuration, etc.) may be processed by the first set of one or more processing cores. The second set of packet types is a subset of the first set of packet types. For example, the second set of one or more processing cores is capable of processing a subset of the ingress packets (e.g., data packets). According to one embodiment of the invention, the second set of packet types includes substantially all ingress packets.

In one embodiment of the invention, each processing core may be assigned any packet regardless of the packet processing capabilities included on the processing cores. If a processing core does not include the capability of processing a particular packet, that packet is redirected to a processing core that includes the capability to process that packet. In an alternative embodiment of the invention, processing cores are assigned packets to process based on their processing capabilities.

In one embodiment of the invention, a packet goes through various processing stages during its processing lifecycle. Each processing stage is identifiable with a processing stage identification. Certain processing stages and/or portions of processing stages require locks to be placed on certain packet flows. For example, if the processing results of a certain stage or received packet needs to be consumed by a subsequent stage or a subsequently received packet, that subsequent stage or subsequently received packet is stalled. If a processing core encounters a lock, the processing core may de-schedule the packet and receive a different packet to process. After the lock is removed, the previously de-scheduled packet is assigned to a core for processing.

Figure 1:
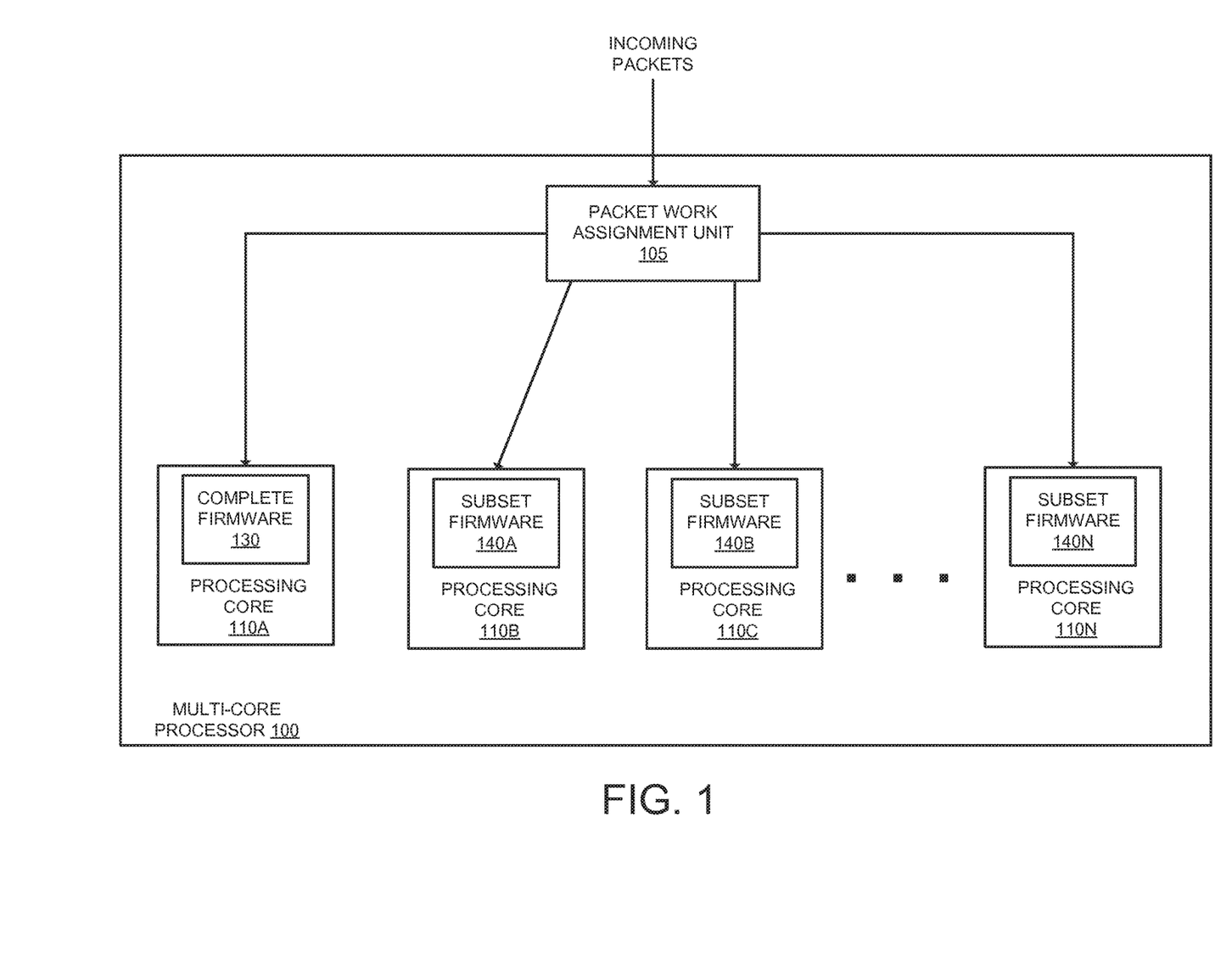
FIG. 1 is a block diagram illustrating an exemplary packet processing architecture on a multi-core processor according to one embodiment of the invention.

FIG. 1 is a block diagram illustrating an exemplary packet processing architecture on a multi-core processor according to one embodiment of the invention. The multi-core processor 100 is included in a secure router according to one embodiment of the invention. The multi-core processor 100 includes N cores. The multi-core processor 100 includes the processing cores 110A-110N, and the packet work assignment unit 105. Other well-known features of multi-core processors are not shown in order not to confuse understanding of the invention (e.g., memory(ies), bus(es), gate(s), etc.). While the packet work assignment unit 105 is illustrated as being included within the multi-core processor 100, other embodiments of the invention have the packet work assignment unit 105 being included outside of the multi-core processor 100.

The complete firmware 130 is loaded onto the processing core 110A (e.g., the processing core 110A executes the complete firmware 130). According to one embodiment of the invention, the complete firmware 130 includes the same processing capabilities as if the processing core 110A was the only processing core available on the multi-core processor 100, including operating system support. For example, the code base for a single core network element may be substantially similar to the complete firmware 130, which minimizes modifications to an existing code base. The subset firmware 140A-140N is loaded onto the processing cores 110B-110N respectively. The subset firmware 140A-140N is a subset of the features and processing capability of the complete firmware 130. According to one embodiment of the invention, the subset firmware 140A-140N does not include operating system functionality. Thus, the amount of code loaded onto each of the processing cores 110B-110N is typically less than the amount of code loaded on to the processing core 110A. According to one embodiment of the invention, the complete firmware 130 may process each packet that the subset firmware 140A-140N may process, and additional packets and configuration management messages that the subset firmware 140A-140N cannot process.

The packet work assignment unit 105 assigns (schedules) work for the processing cores 110A-110N. The packet work assignment unit 105 may assign packets by a number of mechanisms. For example, the packet work assignment unit 105 may include one or more ingress packet buffers (e.g., ingress queue(s)) and assign packets to be processed to the processing cores 110A-110N based on the availability of the processing cores, and based on the order of receipt of the incoming packets. In one embodiment of the invention the processing cores 110A-110N request work from the packet work assignment unit 105 when they are available (e.g., not processing a packet), while in an alternative embodiment of the invention the packet work assignment unit 105 polls the processing cores 110A-110N to determine the availability of the processing cores 110A-110N.

In one embodiment of the invention, the packet work assignment unit 105 separates packets into one or more flows, depending on characteristics of the packet (e.g., source IP address, destination IP address, source port, destination port, protocol, etc.). According to one embodiment of the invention, a particular flow may be assigned to a particular processing core (e.g., all packets from that flow may be assigned to that processing core), while in an alternative embodiment of the invention packets from the same flow may be assigned to different processing cores.

Figure 2:
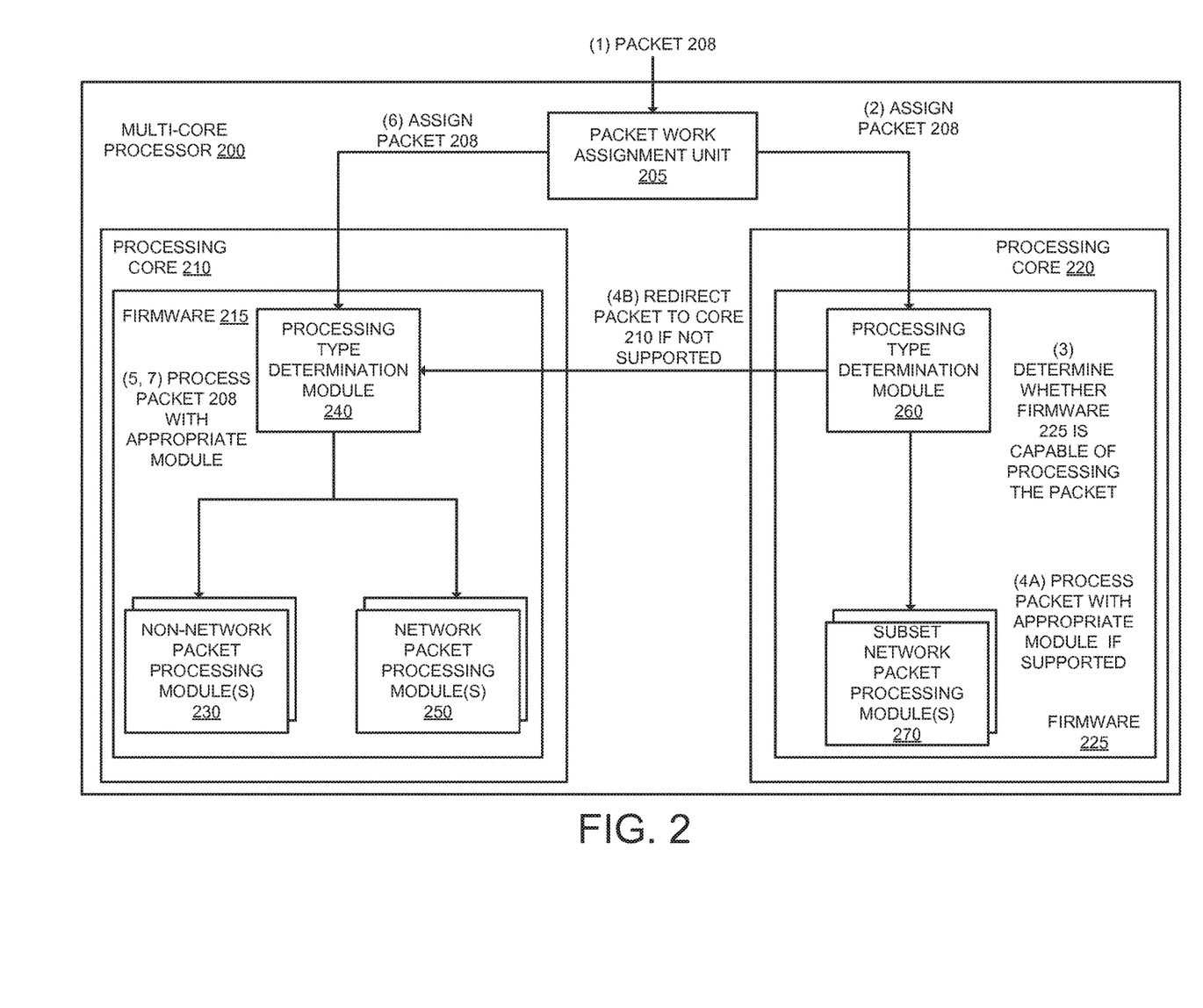
FIG. 2 is a data flow diagram illustrating an exemplary packet processing architecture on a multi-core processor having two processing cores according to one embodiment of the invention.

FIG. 2 is a data flow diagram illustrating an exemplary packet processing architecture on a multi-core processor having two processing cores according to one embodiment of the invention. The multi-core processor 200 includes two processing cores, the processing core 210 and the processing core 220, and the packet work assignment unit 205. Similarly as described with reference to FIG. 1, other well-known features of multi-core processors are not illustrated in order not to confuse understanding of the invention (e.g., memory(ies), bus(es), gate(s), etc.). While the packet work assignment unit 205 is illustrated as being included within the multi-core processor 200, other embodiments of the invention have the packet work assignment unit 205 being included outside of the multi-core processor 200. According to one embodiment of the invention, the multi-core processor 200 is included in a secure router.

The firmware 215 is loaded onto the processing core 210 and the firmware 225 is loaded onto the processing core 220. According to one embodiment of the invention, the firmware 215 includes a complete operating system that includes the functionality to process all ingress packets (including control packets, data packets, configuration packets, etc.) and the firmware 225 includes a subset of the features of the firmware 215. However, it should be understood that in alternative embodiments of the invention the firmware 215 does not include a complete operating system and may not include the functionality to process all ingress packets. The firmware 215 includes the processing type determination module 240, one or more non-network packet processing modules 230, and one or more network packet processing modules 250. The processing type determination module 240 parses work and determines the appropriate processing module to process that work. The one or more non-network packet processing modules 230 are used to process non-network packets (e.g., packets relating to configuration management, etc.). The one or more network packet processing module(s) 250 are used to process each ingress network packet (e.g., data packets, control packets, etc.). According to one embodiment of the invention, the non-network packet processing module(s) 230 and the network packet processing module(s) 250 together define the types of packets the firmware 215 supports processing. Packets belonging to the non-network packet processing module(s) 230 and/or the network packet processing module(s) 250 are packets that may be processed by the non-network packet processing module(s) and/or the network packet processing module(s) 250.

According to one embodiment of the invention, the firmware 225 includes a subset of the features of the firmware 215. The firmware 225 includes the processing type determination module 260 and one or more subset network packet processing modules 270. The network packet processing module(s) 270 is a subset of the network packet processing module(s) 250. For example, the network packet processing module(s) 270 cannot process each packet that the network packet processing module(s) 250 may process. According to one embodiment of the invention, control packets may be processed by the network packet processing module(s) 250 and cannot be processed by the subset network packet processing module(s) 270. While in one embodiment of the invention the firmware 225 includes support for processing packets requiring operating system support, in an alternative embodiment of the invention the firmware 225 does not include support for processing packets that require operating system support. According to one embodiment of the invention, the subset network packet processing module(s) 270 define the types of packets the firmware 225 supports processing. Packets belonging to the subset network packet processing module(s) 270 are packets that may be processed by the subset network packet processing module(s) 270.

According to one embodiment of the invention, the network packet processing module(s) 270 includes support for processing substantially most packets (i.e., most of the packets to be processed by the multi-core processor 200 are capable of being processed by the subset network packet processing module(s) 270). Packets that cannot be processed by the subset network packet processing module(s) 270 may be re-directed to the processing core 210 (these packets may be referred to as "exception" packets). According to one embodiment of the invention, the processing type determination module 260 determines whether the subset network packet processing module(s) 270 is capable of processing an incoming packet, and if so, which of the subset network packet processing module(s) can process that packet. For example, the processing type determination module 260 determines the type of the packet, and whether processing that type of packet is supported by one or more of the subset network packet processing module(s) 270.

In one embodiment of the invention, the majority of network packets (e.g., "non-exception" packets such as certain data packets, etc.) may be processed by either the processing core 210 or the processing core 220. In other words, the processing core 210 and the processing core 220 may each process the majority of packets. However, for the minority of network packets (e.g., "exception" packets such as certain control packets, configuration packets, etc.), only the processing core 210 is capable of processing those packets.

This multi-core packet processing architecture increases throughput, efficiency, is scalable with two or more processing cores, and reduces the amount of code base required for packet processing. For example, in a typical "slow path" architecture, which has a set of one or more processing cores being dedicated for processing only "exception" packets, those processing cores are idle when not processing "exception" packets. By way of example, in previous multi-core processing architectures, if the multi-core processor has two processing cores, one being dedicated for processing "exception" packets and the other being dedicated for processing "non-exception" packets, it should be understood that the processing core dedicated for processing "exception" packets remains idle most of the time ("exception" packets are encountered much less frequently than "non-exception" packets). In contrast, embodiments of the invention include a first set of one or more processing cores capable of processing "exception" packets and "non-exception" packets (e.g., all packets), and a second set of one or more processing cores capable of processing "non-exception" packets (e.g., the majority of packets). Thus, embodiments of the invention reduce the amount of time any of the processing cores of a multi-core processor are idle, which increases packet processing throughput and efficiency.

In addition, unlike other multi-core packet processing architectures which load the same packet processing capability on each processing core (which increases the code base and complexity of the architecture), embodiments of the invention allow for a reduced code size. For example, in some embodiments of the invention only a single processing core is loaded with a complete firmware (e.g., including an operating system that is capable of processing configuration management, data packets, control packets, etc.) while the other processing cores are loaded with a certain subset of that firmware to process the majority of the packets that the multi-core processor will encounter. Of course it should be understood that in alternative embodiments of the invention more than one processing core is loaded with a complete firmware.

Referring back to FIG. 2, at operation 1, the packet 208 enters the packet work assignment unit 205. For example, the packet 208 was received by an interface into the network element and stored in memory and a reference to that packet was placed into an ingress queue associated with the packet work assignment unit 205. According to one embodiment of the invention, the packet work assignment unit 205 assigns work to the processing cores 210 and 220 based on their availability without regard to their individual packet processing capability (e.g., without regard to whether they are loaded with the appropriate packet processing module to process that packet). However, it should be understood that in an alternative embodiment of the invention, the packet work assignment unit 205 assigns work to the processing cores 210 and 220 differently (e.g., based on their availability and/or based in respect to their individual packet processing capability, round-robin, etc.). For purposes of the following description, the packet work assignment unit 205, as illustrated in FIG. 2, determines to assign work to the processing cores 210 and 220 based on their processing availability. Thus, either processing core 210 or 220 may be assigned to process the packet 208 regardless of whether the processing cores 210 or 220 are loaded with the processing module(s) to process the packet 208. Therefore, the operations 2-5 describe the operations performed when the packet work assignment unit 205 assigns the packet 208 to be processed by the processing core 220, and the operations 6 and 7 describe the operations performed when the packet work assignment unit 205 assigns the packet 208 to be processed by the processing core 210.

At operation 2, the packet work assignment unit 205 assigns the packet 208 to be processed by the processing core 220. The packet work assignment unit 205 may assign the packet 208 in any number of ways, including causing a reference to be inserted into a work queue of the processing core 220, causing the packet 208 to be read into a memory of the processing core 220, etc. At operation 3, the processing type determination module 260 determines the type of the packet 208 and whether the firmware 225 (loaded on the processing core 220) is capable of processing the packet 208 (e.g., whether the packet 208 belongs to the subset network packet processing module(s) 270). There are many ways the processing type determination module 260 determines whether the firmware 225 has the functionality to process the packet 208. For example, in one embodiment of the invention, the processing type determination module 206 determines the type of the packet 208 (e.g., whether the packet is a data packet, a control packet, a packet related to configuration, etc.) and whether the subset network packet processing module(s) 270 includes one or more modules necessary to process the packet 208. According to one embodiment of the invention, the processing type determination module 206 determines the type of packet 208 from the header of the packet. In an alternative embodiment of the invention, the packet work assignment unit associates each work item with a processing phase identifier which the processing type determination module 260 may use when determining whether the firmware 225 has the functionality to process that packet.

If the processing type determination module 260 determines that the packet 208 belongs to the subset network packet processing module(s) 270 and thus may be processed by the firmware 225, at operation 4A the packet is processed with the appropriate module. Thus, in operation 4A, the packet 208 is determined to be a "non-exception" packet and is processed by one or more of the subset network packet processing module(s) 270.

If the processing type determination module 260 determines that the packet 208 does not belong to the subset network packet processing module(s) 270 and thus cannot be processed by the firmware 225, at operation 4B the packet is redirected to the core 210. Thus, in operation 4B, the packet 208 is determined to be an "exception" packet which cannot be processed by the firmware 225. The packet may be redirected in any number of ways. For example, the packet 208 may be returned to the packet work assignment unit 205, which may then place the packet into a specialized queue for the processing core 210. Thus, when the processing core 210 is available for work, the packet work assignment unit 205 assigns the packet 208 to the processing core 210. Of course, other redirection mechanisms may be used in embodiments of the invention described herein. Sometime later, after being assigned the packet 208 which has been redirected, at operation 5, the firmware 215 processes the packet 208 with the appropriate packet processing module (e.g., one or more of the non-network packet processing module(s) 230 and network packet processing module(s) 250).

At operation 6, the packet work assignment unit 205 assigns the packet 208 to be processed by the processing core 210. Since the firmware 215 includes a complete operating system capable of processing any ingress packet, the processing type determination module 240 determines which packet processing module(s) are used to process packets of that type (e.g., whether the packet is a non-network packet (e.g., related to configuration management) or a network packet), and at operation 7, that packet is processed with the appropriate packet processing module. It should be understood that with reference to operations 6-7, the packet 208 may either be an "exception" packet or a "non-exception" packet with respect to the processing core 220. In either case, the firmware 215 loaded on the processing core 210 is capable of processing the packet 208. Of course, it should be understood that the firmware 215 may not always be successful in processing each packet (e.g., if the packet is malformed and/or corrupted).

Figure 3:
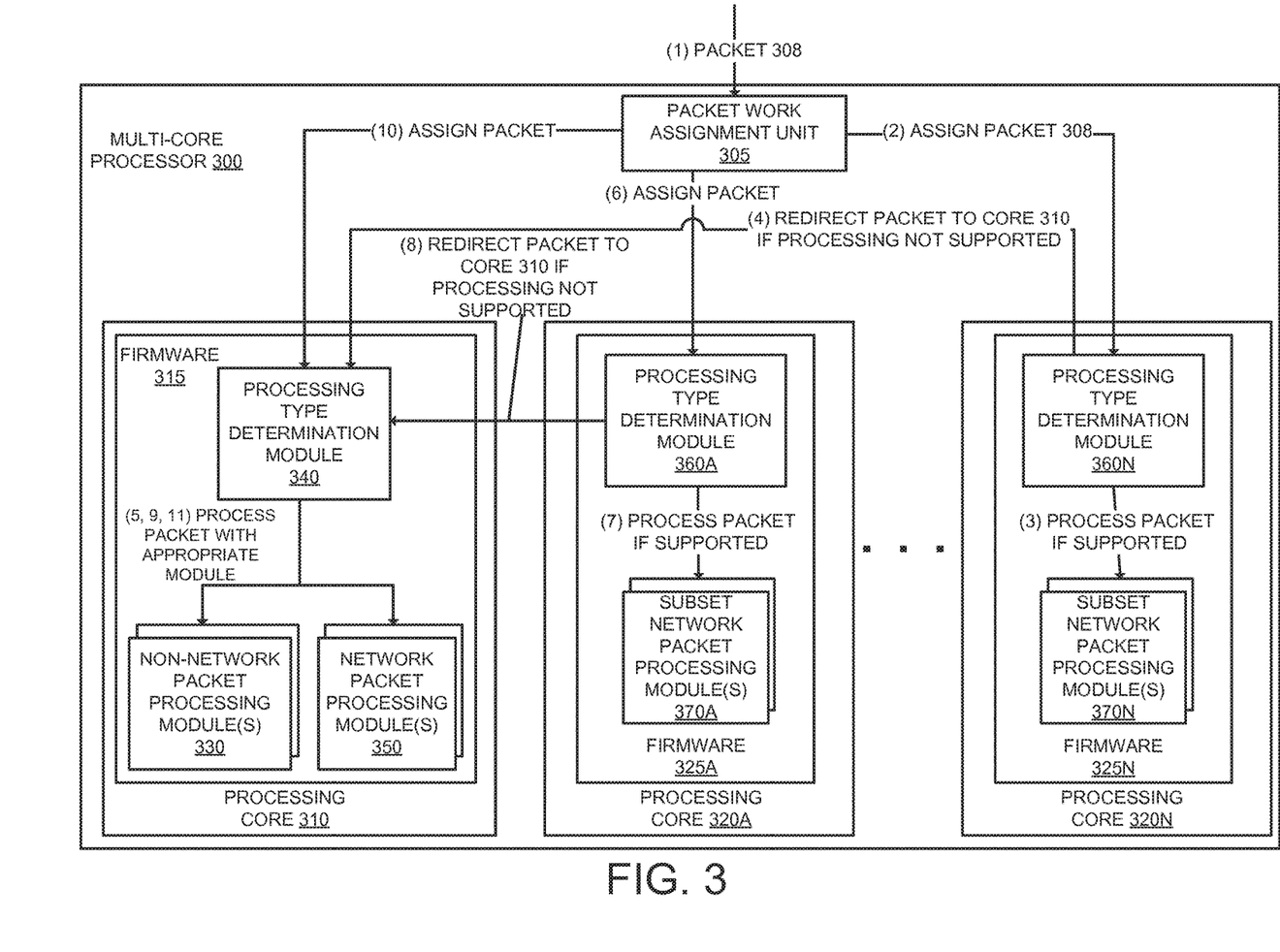
FIG. 3 is a data flow diagram illustrating an exemplary packet processing architecture on a multi-core processor having two or more processing cores according to one embodiment of the invention.

Although FIG. 2 illustrates a multi-core packet processing architecture for multi-core processor having two processing cores, this architecture may be extended for any number of processing cores. For example, FIG. 3 is a data flow diagram illustrating a multi-core packet processing architecture for a multi-core processor having two or more processing cores according to one embodiment of the invention. The multi-core processor 300 includes the processing cores 310 and 320A-320N, and the packet work assignment unit 305. According to one embodiment of the invention, the packet work assignment unit 305 performs similarly to the packet work assignment unit 205 as described with reference to FIG. 2. According to one embodiment of the invention, the multi-core processor 300 is included within a network element.

The firmware 315 is loaded onto the processing core 310. According to one embodiment of the invention, the firmware 315 is similar to the firmware 215 described in reference with FIG. 2 (e.g., the firmware is a complete firmware image including operating system support). However, it should be understood that in alternative embodiments of the invention the firmware 315 does not include a complete operating system and may not include the functionality to process all ingress packets. The firmware 315 includes the processing type determination module 340, the non-network packet processing module(s) 330, and the network packet processing module(s) 350. According to one embodiment of the invention, the processing type determination module 340, the non-network packet processing module(s) 330, and the network packet processing module(s) 350 perform similarly as the processing type determination module 240, the non-network packet processing module(s) 230, and the network packet processing module(s) 250 as described with reference to FIG. 2. According to one embodiment of the invention, the non-network packet processing module(s) 330 and the network packet processing module(s) 350 together define the types of packets the firmware 315 supports processing. Packets belonging to the non-network packet processing module(s) 330 and/or the network packet processing module(s) 350 are packets that may be processed by the non-network packet processing module(s) and/or the network packet processing module(s) 350.

The firmware 325A-325N is loaded onto the processing cores 320A-320N respectively. According to one embodiment of the invention, the firmware 325A-325N are each similar to the firmware 225 as described with reference to FIG. 2 (e.g., the firmware 325A-325N each include a subset of the features of the firmware 315). While in one embodiment of the invention each of the firmware 325A-325N are the same firmware image, in an alternative embodiment of the invention at least some of the firmware 325A-325N include a different firmware image while maintaining being a subset of the firmware 315 (e.g., the firmware 325A may include support for web traffic while the firmware 325B may include support for email traffic). The firmware 325A-325N includes the processing type determination modules 360A-360N respectively, and the subset network packet processing module(s) 370A-370N respectively. According to one embodiment of the invention, the subset network packet processing module(s) 370A-370N define the types of packets the firmware 325A-325N respectively support processing. Packets belonging to the subset network packet processing module(s) 370A-370N are packets that may be processed by the subset network packet processing module(s) 370A-370N respectively. While in one embodiment of the invention the type(s) of packets belonging to the processing module(s) 370A-370N are the same (i.e., each of the processing module(s) 370A-370N support processing the same type(s) of packets), in alternative embodiments of the invention the type(s) of packets belonging to the processing module(s) 370A-370N may be different between one or more of those processing module(s) 370A-370N.

At operation 1, the packet 308 enters the packet work assignment unit 305. For example, the packet 308 was received by an interface into the network element and stored in memory and a reference to that packet was placed into an ingress queue associated with the packet work assignment unit 305. Similarly as described with reference to the packet work assignment unit 205, the packet work assignment unit 305 may assign the packet 308 to any of the processing cores of the multi-core processor 300 (e.g., the processing core 310 or any of the processing cores 320A-320N). In addition, in some embodiments the packet work assignment unit 305 assigns the packet 308 to a processing core which supports processing the packet 308. The operations 2-5 describe the operations performed when the packet work assignment unit 305 assigns the packet 308 to be processed by the processing core 320N, the operations 6-9 describe the operations performed when the packet work assignment unit 305 assigns the packet 308 to be processed by the processing core 320A, and the operations 10-100 describe the operations performed when the packet work assignment unit 305 assigns the packet 308 to be processed by the processing core 310.

At operation 2, the packet work assignment unit 305 assigns the packet 308 to be processed by the processing core 320N. The packet work assignment unit 305 may assign the packet 308 with numerous mechanisms (e.g., as described with reference to FIG. 2). Sometime later at operation 3, the packet 308 is processed by the subset network packet processing module(s) 370N upon the processing type determination module 360N determining that the firmware 325N includes the functionality to process the packet 308. However, if the processing type determination module 360N determines that the firmware 325N does not include the functionality to process the packet 308, at operation 4 the packet 308 is redirected to the processing core 310 for processing. As described with reference to FIG. 2, the packet 308 may be redirected to the processing core 310 in any number of ways. Sometime later, at operation 5, the packet 308 is processed by the firmware 315 loaded onto the processing core 310.

If the packet work assignment unit 305 determines to assign the packet 308 to the processing core 320A, the following operations are performed. At operation 6, the packet work assignment unit 305 assigns the packet 308 to be processed by the processing core 320A. Sometime later at operation 7, the packet 308 is processed by the subset network packet processing module(s) 370A upon the processing type determination module 360A determining that the firmware 325A includes the functionality to process the packet 308. However, if the processing type determination module 360A determines that the firmware 325A does not include the functionality to process the packet 308, at operation 8 the packet 308 is redirected to the processing core 310 for processing. As described with reference to FIG. 2, the packet 308 may be redirected to the processing core 310 in any number of ways. Sometime later, at operation 9, the packet 308 is processed by the firmware 315 loaded onto the processing core 310.

At operation 10, the packet work assignment unit 305 assigns the packet 308 to be processed by the processing core 310. Since the firmware 315 includes a complete operating system capable of processing any ingress packet, the processing type determination module 340 determines which packet processing module(s) are used to process packets of that type (e.g., whether the packet is a non-network packet (e.g., related to configuration management) or a network packet), and sometime later at operation 11, that packet is processed with the appropriate packet processing module. It should be understood that with reference to operations 10-11, the packet 308 may either be an "exception" packet or a "non-exception" packet in respect to the processing cores 320A-320N. In either case, the firmware 315 may process the packet 308. Of course, it should be understood that the firmware 315 may not always be successful in processing each packet (e.g., if the packet is malformed and/or corrupted). Thus, the multi-core packet processing architecture of the embodiments described herein may be implemented on a multi-core processor having two or more processing cores.

Figure 4:
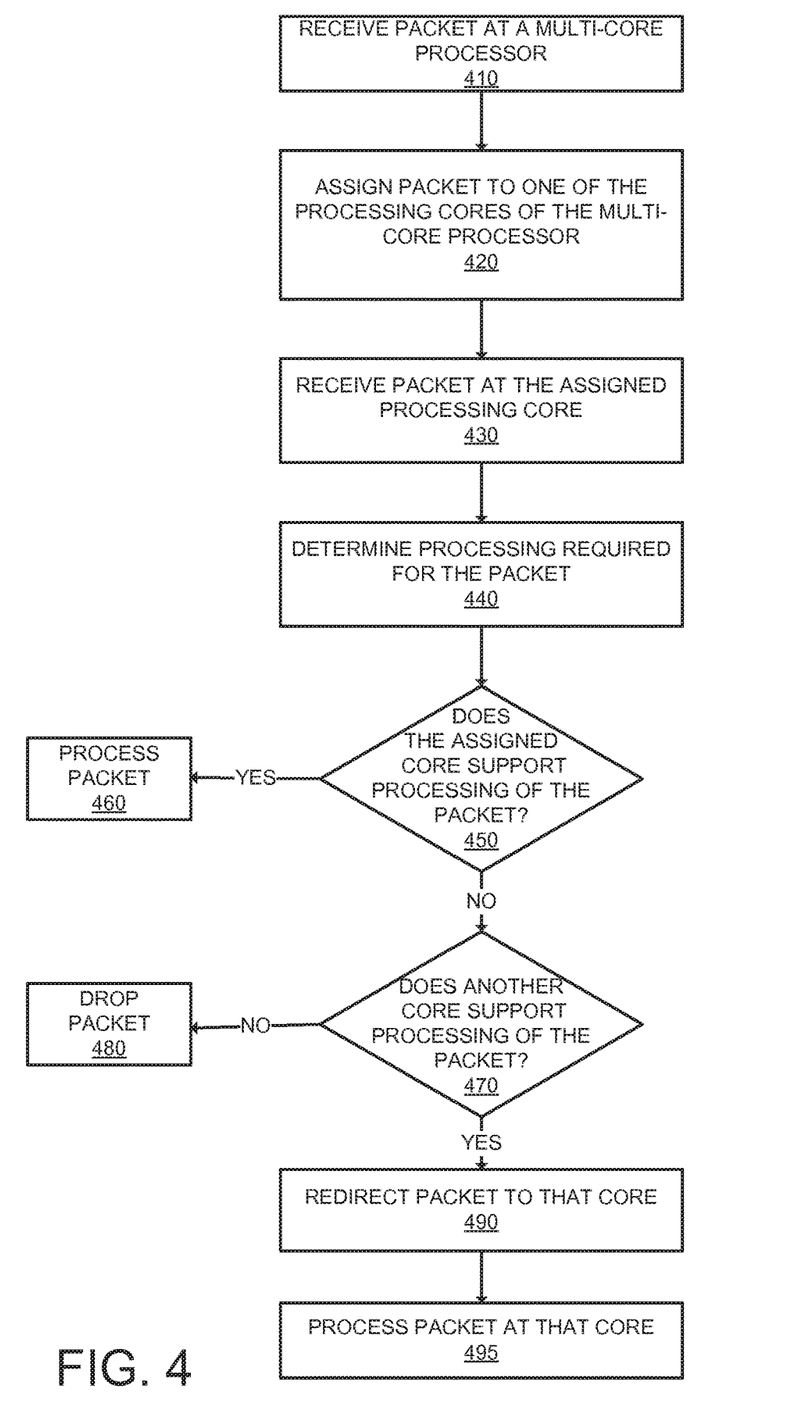
FIG. 4 is a flow diagram illustrating operations of an exemplary multi-core packet processing architecture according to one embodiment of the invention.

FIG. 4 is a flow diagram illustrating operations of an exemplary multi-core packet processing architecture according to one embodiment of the invention. At operation 410, a packet is received at a multi-core processor (e.g., a multi-core processor of a secure router). According to one embodiment of the invention, a first set of one or more of the processing cores of the multi-core processor is loaded with packet processing modules capable of processing any received packet, and a second set of one or more of the processing cores of the multi-core processor is loaded with a subset of the packet processing modules which, while not capable of processing any received packet, may process most received packets. Flow moves from block 410 to block 420. At block 420, the packet is assigned to one of the processing cores of the multi-core processor, without taking into account the processing capabilities loaded onto the processing cores (i.e., the packet may be assigned to any of the processing cores). Flow moves from block 420 to block 430, where the packet is received at the assigned processing core. Flow moves from block 430 to block 440.

At block 440, the assigned processing core determines the processing required for the packet. Flow moves from block 440 to block 450. At block 450, a determination is made whether the assigned core supports processing the received packet (e.g., whether the packet belongs to one or more packet processing modules loaded on the assigned core). The assigned processing core may not support processing the received packet for a number of reasons (e.g., the assigned processing core does not include the appropriate packet processing module(s) to process the packet, the assigned processing core is configured not to process packets of that type, etc.). If the assigned processing core supports processing the packet, then flow moves to block 460 where the packet is processed. However, if the assigned processing core does not support processing the packet, then flow moves to block 470. At block 470, a determination is made whether another processing core supports processing the packet. If another processing core does not support processing the packet, then flow moves to block 480 where the packet is dropped. If another processing core supports processing the packet, then flow moves to block 490, where the packet is redirected to that processing core. Flow then moves to block 495 where the packet is then processed.

Figure 5:
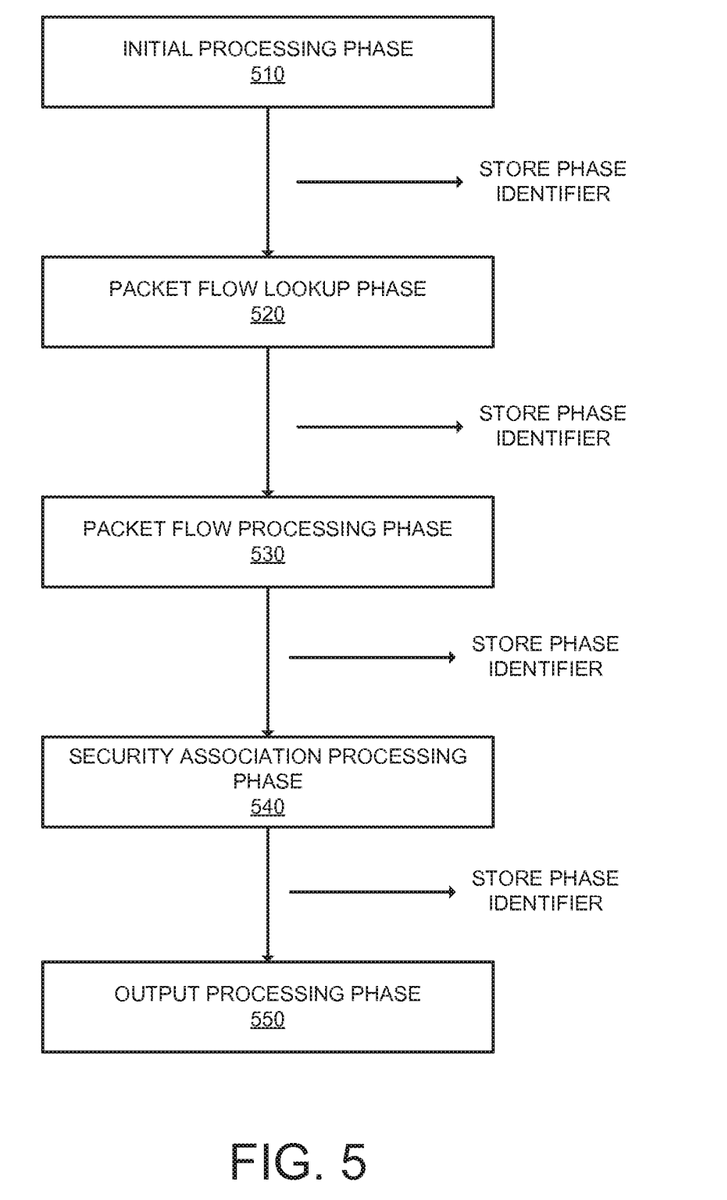
FIG. 5 is a conceptual flow diagram illustrating an exemplary processing phases of a packet being executed according to one embodiment of the invention.

FIG. 5 is a conceptual flow diagram illustrating an exemplary processing phases of a packet being executed by a multi-core processor according to one embodiment of the invention. Packet processing may be split into multiple packet processing stages, each being capable of being processed by a different processing core of a multi-core processor. FIG. 5 illustrates five separate processing phases of a packet, however it should be understood that the number and type of processing phases may vary according to the type of packet received. Each processing phase is identified with a phase identifier. According to one embodiment of the invention, after completion of each phase, the phase identifier of that phase is associated with the packet. According to one embodiment of the invention, certain packet processing phases and/or certain packets of the same flow must be processed in order, and certain packet processing phases cannot be processed concurrently with other packet processing phases. According to one embodiment of the invention, transitioning between packet processing phases requires certain locks (e.g., a semaphore, a tag, etc.) to be obtained.

At block 510, the packet processing enters into an initial processing phase. As described previously, in some embodiments of the invention, the multi-core processor separates received packets into traffic flows. Typically, packets belonging to the same flow have the same source and destination addresses. Separating packets into traffic flows assists in the ordering and synchronizing of packets. In one embodiment of the invention, the initial processing phase 510 includes assigning the packet to a traffic flow based on properties of the packet (e.g., source IP address, destination IP address, source port, destination port, protocol, etc.). In addition to separating packets into traffic flows, in some embodiments of the invention the initial processing phase 510 includes assigning a tag type and value to the packet which determines the order in which the packet is processed (order as compared to other packets of the same traffic flow) and whether multiple packets with the same tag type and value may be processed concurrently. At the conclusion of the initial processing phase, a phase identifier indicating that the processing stage has been completed is stored. Flow moves from block 510 to block 520.

At block 520, the packet enters into a packet flow lookup phase, where the packet flow list is accessed. At the conclusion of the packet flow lookup phase, a phase identifier indicating that the processing stage has been completed is stored. Flow moves from block 520 to block 530. At block 530, the packet enters into the packet flow processing phase. According to one embodiment of the invention, only a single processing core may have access to the packet flow (for a given flow) at a given time. Thus, a lock on that flow must be obtained. In order to prevent head of the line blocking, according to some embodiments of the invention, a processing core that encounters a lock for a given packet de-schedules that packet (e.g., returns that packet back to the ingress queue) and receives another packet to process. Since a processing phase identifier is associated with that packet, the packet may be resumed at that specific processing phase as soon as the lock is removed. At the conclusion of the packet flow processing phrase, a phase identifier indicating that the processing phase has been completed is stored. Flow moves from block 530 to block 540.

At block 540, the packet enters into a security association processing phase. It should be understood that not every packet will enter into a security association processing phase. The security association processing phase will be skipped if the packet does not require security association processing. At the conclusion of the security association processing phase, a phase identifier indicating that the processing phase has been completed is stored. Flow moves from block 540 to block 550. At block 550, the packet enters into an output processing phase.

Figure 6:
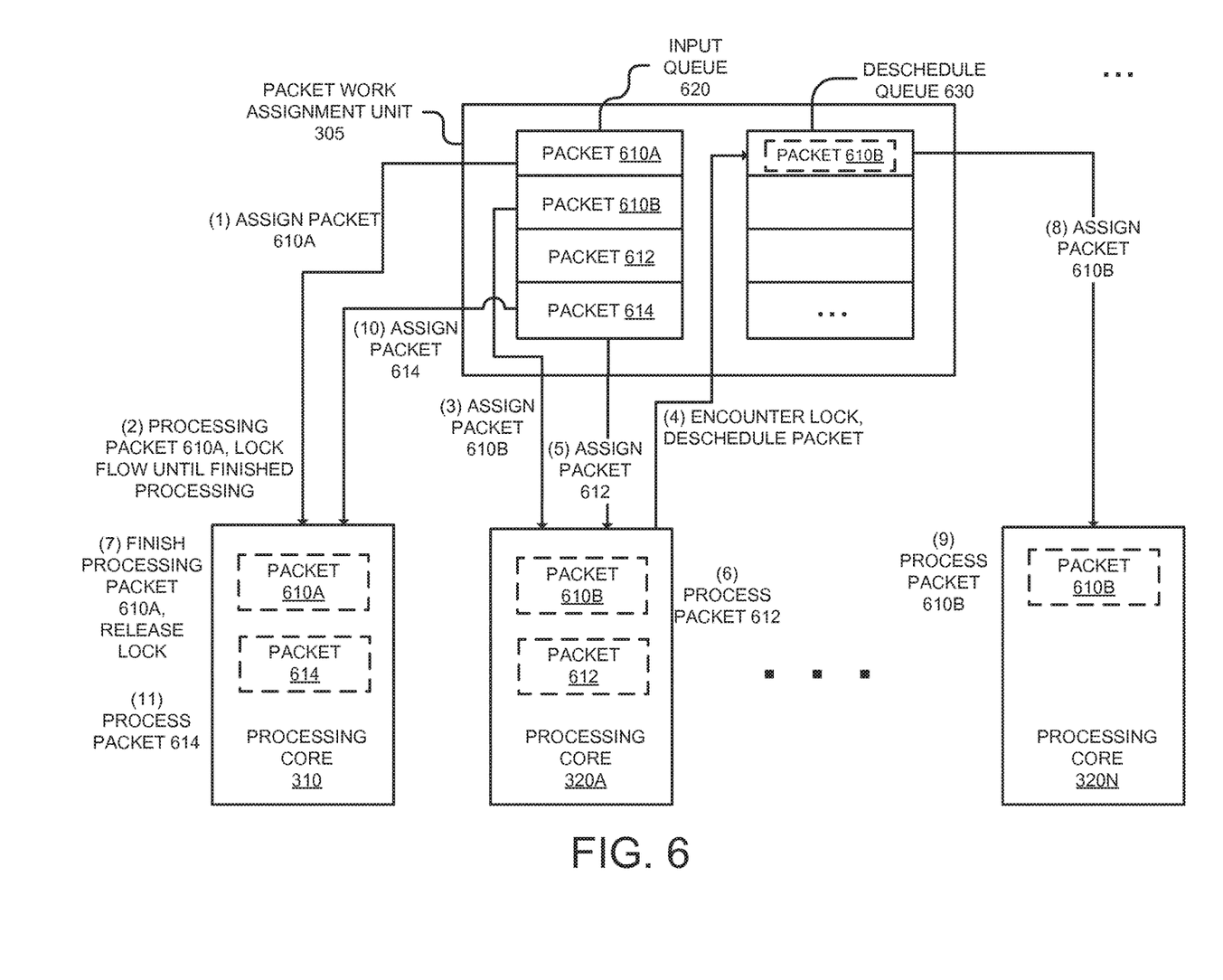
FIG. 6 is a data flow diagram illustrating scheduling and de-scheduling packet processing to cores of a multi-core processor according to one embodiment of the invention.

FIG. 6 is a data flow diagram illustrating scheduling and de-scheduling packet processing to cores of a multi-core processor according to one embodiment of the invention. According to one embodiment of the invention, packets are processed according to the multi-core packet processing architecture described in reference to FIG. 3. However, aspects of the invention are not so limited, as alternative packet processing architectures may be used in embodiments of the invention described with reference to FIG. 6.

The packet work assignment unit 305 includes the input queue 620 and the de-schedule queue 630. The input queue 620 stores packets to be processed and to be assigned to a processing core, while the de-schedule queue 620 stores packets which have been assigned and de-scheduled, which will be described in greater detail later herein. While in one embodiment of the invention the input queue 620 and the de-schedule queue 630 are implemented as a FIFO (first-in-first-out) queue, in alternative embodiments of the invention the input queue 620 and the de-schedule queue 630 is implemented differently. The packets 610A-610B, 612, and 614 are stored in the input queue 620. According to one embodiment of the invention, the packets 610A-610B are associated with the same flow (e.g., they have the same source and destination). In addition, for the following discussion, at least certain processing phases of the packet 610B cannot be processed until certain processing phases of the packet 610A have completed processing (i.e., certain packet processing phases must be completed in order).

At operation 1, the packet work assignment unit 305 assigns the packet 610A to be processed by the processing core 310 (illustrated by the packet 610A being inside a dashed box within the processing core 310). With reference to FIG. 6, at operation 2 the processing core 310A begins processing the packet 610A. As part of the processing of the packet 610A, the processing core 310 enters a processing phase which requires a lock to be placed on other packets of that traffic flow (at least to the extent of at least one processing phase) until the processing phase has been completed. Since the packet 610B belongs to the same traffic flow as the packet 610A, at least some of the packet processing phases of the packet 610B needs to be performed after at least some of the processing phases of the packet 610A have been completed.

At operation 3, the packet work assignment unit 305 assigns the packet 610B to the processing core 320A (represented by the packet 610B inside a dashed box within the processing core 320A). According to one embodiment of the invention, the packet 610B is assigned to the processing core 320A prior to the processing core 310 releasing the lock. The processing core 320A processes the packet 610B until it reaches the processing phase when it encounters the lock. As described with reference to FIG. 5, at the end of each processing phase, a processing phase identifier is associated with the packet. Since at least some of the processing phases of the packet 610B cannot be processed while a lock is obtained on the flow, at operation 4, the processing core 320A de-schedules the packet 610B (e.g., return the packet 610B to the packet work assignment unit 305) once it encounters the lock, with the intention that the processing core 320A will be assigned a different packet to process. It should be understood that if the processing core 320A does not de-schedule the packet 610B, the processing core 320A will remain idle until the lock has been released. Thus, at operation 4, the processing core 320A encounters the lock and de-schedules the packet 610B. According to one embodiment of the invention, the packet 610B is returned back to the packet work assignment unit 305 and stored in the de-schedule queue 630. Depending on when the lock was encountered, the packet 610B may be partially processed when it is de-scheduled. It should be understood that any processing phase identifier associated with the packet remains associated with the packet. Thus, the processing of the packet 610B may be resumed at the particular processing phase it was at when the lock was encountered. At operation 5, the packet work assignment unit 305 assigns the packet 612 to the processing core 320A (represented with the packet 612 inside a dashed box within the processing core 320A). There is no lock preventing the processing of the packet 612, thus at operation 6, the processing core 320A processes the packet 612. At operation 7, the processing core 310A finishes processing at least the processing phase of the packet 610A requiring the lock and thus removes the lock.

According to one embodiment of the invention, the packet work assignment unit 305 gives priority to scheduling packets in the de-schedule queue 630. For example, packets in the de-schedule queue 630 are scheduled prior to scheduling packets in the ingress queue 620. Thus, at operation 8, the packet work assignment unit 305 assigns the processing core 320N to process the packet 610B from the de-schedule queue 630. At operation 9, the processing core 320N processes the packet 610B. According to one embodiment of the invention, the processing core 320N resumes processing of the packet 610B at the particular processing phase that encountered the lock (e.g., by determining the appropriate processing phase by reading the processing phase identifier associated with the packet 610B).

At operation 10, the packet work assignment unit 305 assigns the packet 614 to the processing core 310 (represented by the packet 614 illustrated in a dashed box within the processing core 310). At operation 11, the processing core 310 processes the packet 614.

Figure 7:
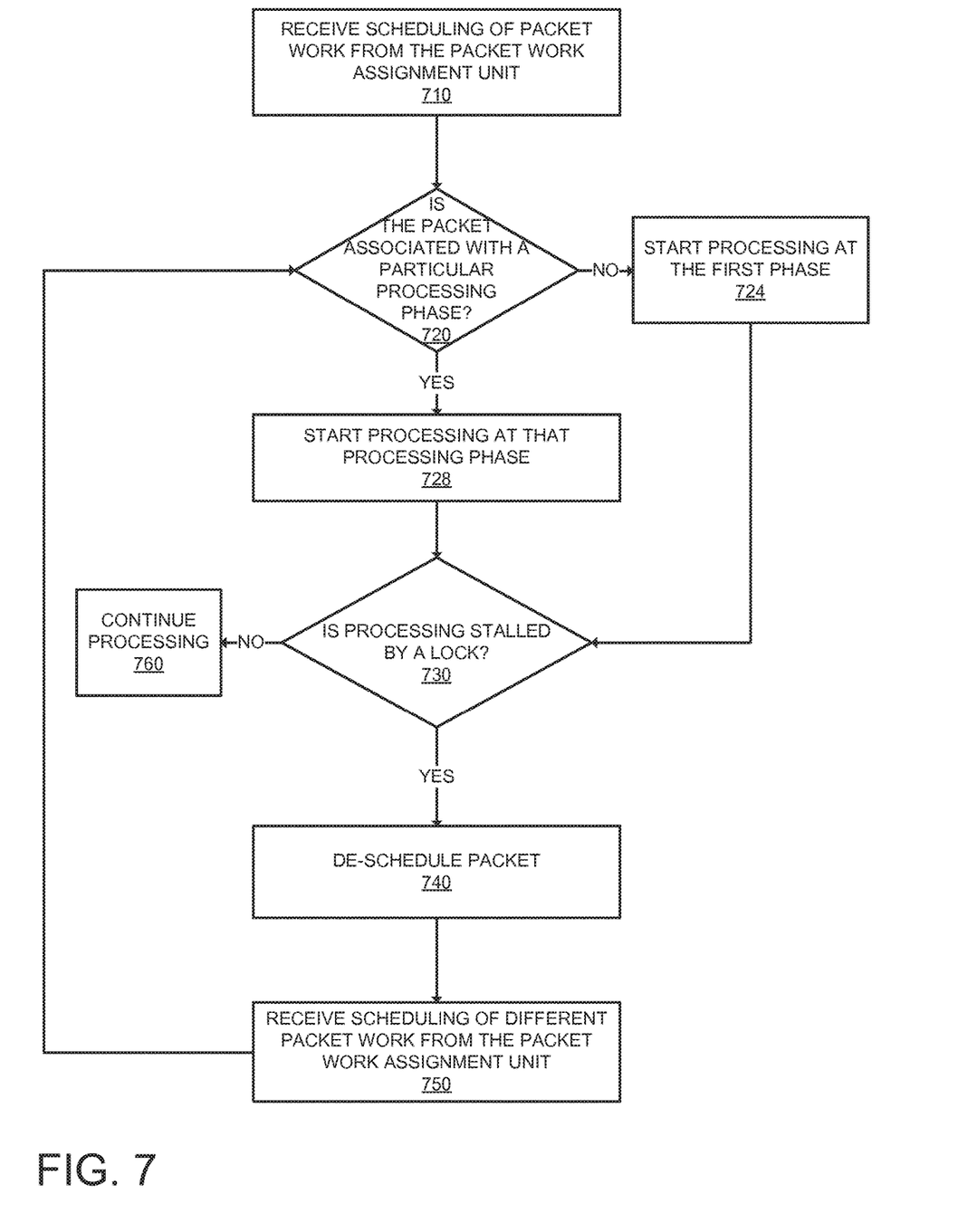
FIG. 7 is a flow diagram illustrating operations for de-scheduling packet processing to prevent head of the line blocking according to one embodiment of the invention.

FIG. 7 is a flow diagram illustrating operations for de-scheduling packet processing to prevent head of the line blocking according to one embodiment of the invention. According to one embodiment of the invention, a processing core (e.g., one of the processing cores 310 or 320A-320N) performs the operations illustrated in FIG. 7.

At block 710, a processing core receives the scheduling of packet processing work from the packet work assignment unit. Flow moves from block 710 to block 720. At block 720, a determination is made whether the packet processing work is associated with a particular processing phase. For example, the processing core determines whether a processing phase identifier is associated with the packet. If there is no packet processing phase associated with the packet, flow moves to block 724 where processing begins. If there is a packet processing phase associated with the packet, flow moves to block 728 where processing begins at that processing phase. Flow moves from block 724 and 728 to block 730.

At block 730, a determination is made whether the processing is stalled by a lock. If the processing is not stalled by a lock, then flow moves to block 760 where the packet work is processed. However, if the processing is stalled by a lock, then flow moves to block 740 where the packet is de-scheduled (e.g., returned to the packet work assignment unit). Flow moves from block 740 to block 750. At block 750, the processing core receives scheduling of packet work of a different packet from the packet work assignment unit, and flow moves back to block 720.

While FIG. 3 illustrated a multi-core processing architecture having one of the processing cores (e.g., the processing core 310) including a complete firmware, it should be understood that in some embodiments of the invention a plurality of processing cores may include a complete firmware.

While embodiments of the invention have described a multi-core processing architecture having one or more of the processing cores including a complete firmware, it should be understood that in some embodiments of the invention a set of two or more processing cores may collectively include the functionality of a complete firmware. For example, in one embodiment of the invention, each processing core of the collective complete firmware set may include the capability of processing at least certain data packets, and one or more processing cores of the set may include the capability of processing configuration packets while different one or more processing cores may include the capability of processing control packets.

It should be understood that the types of packets described herein (e.g., control packets, data packets, configuration packets) are exemplary, additional and/or alternative types of packets may be used in embodiments of the invention described herein.

While the flow and data flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for packet processing, the method comprising:
   receiving packets sent over a communication network to a multi-processor system;
   identifying that a first set of the received packets belongs to a first flow of data packets based on one or more common properties across the first set of received packets;
   assigning a first tag type and a first value to each of a first packet and a second packet of the first set of received packets, the first tag type and the first value identifying data packets of the first set of received packets that can be processed concurrently at the multiprocessor system;
   processing the first packet and the second packet concurrently at the multi-processor system based on the first packet and the second packet each being assigned the first tag type and the first value.

2. The method of claim 1, further comprising
   assigning a tag type and a value to each of the first set of received packets, wherein the first tag type and the first value identify data packets of the first set of received packets that can be processed concurrently at the multi-processor system; and
   identifying that the first packet and the second packet of the first set of received packets can be processed concurrently based on the first packet and the second packet having been assigned the first tag type and the first value.

3. The method of claim 2, wherein the first packet is processed at a first processor at the multi-processor system and the second packet is processed at a second processor at the multi-processor system when the first packet and the second packet are concurrently processed.

4. The method of claim 1, further comprising:
   receiving additional packets that are associated with the first flow;
   identifying that the additional packets are associated with the first flow;
   assigning one or more tag types and values to the additional packets, the one or more tag types and values identifying an order for processing the additional packets; and
   processing the additional packets according to the order for processing the additional packets.

5. The method of claim 1, further comprising:
   separating the identified first set of the received packets in the first flow from other received packets associated with at least one other flow;
   assigning one or more values to each of the packets from the at least one other flow, the one or more values associated with an order for processing the packets from the at least one other flow;
   processing a first portion of at least one packet of the packets from the at least one other flow;
   identifying that the at least one packet should be locked until another processing task associated with the at least one other flow has completed;
   identifying that the another processing task has completed; and
   continuing the processing of the at least one packet based on the identified completion of the another processing task.

6. The method of claim 2, further comprising:
   identifying that at least a portion of a third packet and a portion of a fourth packet can be processed concurrently;
   processing the at least portion of the third packet and the portion of the fourth packet concurrently;
   locking the processing of the third packet based on an identification that the third packet should be locked until another processing task associated with the first flow has completed;
   identifying that the another processing task has completed; and
   continuing the processing of the third packet based on the identified completion of the another processing task.

7. The method of claim 1, further comprising:
   storing a first set of program code in a local memory of a first processing core at the multi-processor system, the first set of program code executable to process a first set of processing tasks and not a second set of processing tasks; and
   storing the first set of program code and the second set of program code in a local memory of a second processing core at the multi-processor system, wherein a first set of processing tasks are processed at the first processing core based on the first set of program code stored in the local memory of the first processing core and wherein a second set of processing tasks are processed at the second processing core based on the second set of program code being stored in the local memory of the second processing core.

8. The method of claim 7, wherein the first set of processing tasks are associated with processing more than fifty percent of all packet processing tasks executed at the multi-processor system and the second set of processing tasks are associated with processing less than fifty percent of all of the packet processing tasks executed by the multi-processing system.

9. A non-transitory computer-readable storage medium having embodied thereon a program executable by a processor for implementing a method for packet processing, the method comprising:
   receiving packets sent over a communication network to a multi-processor system;
   identifying that a first set of the received packets belongs to a first flow of data packets based on one or more common properties across the first set of received packets;
   assigning a first tag type and a first value to each of a first packet and a second packet of the first set of received packets, the first tag type and the first value identifying data packets of the first set of received packets that can be processed concurrently at the multiprocessor system;
   processing the first packet and the second packet concurrently at the multi-processor system based on the first packet and the second packet each being assigned the first tag type and the first value.

10. The non-transitory computer-readable storage medium of claim 9, the program further executable to
    assign a tag type and a value to each of the first set of received packets, wherein first tag type and the first value identify data packets of the first set of received packets that can be processed concurrently at the multi-processor system; and identify that the first packet and the second packet of the first set of received packets can be processed concurrently based on the first packet and the second packet having been assigned the first tag type and the first value.

11. The non-transitory computer-readable storage medium of claim 10, wherein the first packet is processed at a first processor at the multi-processor system and the second packet is processed at a second processor at the multi-processor system when the first packet and the second packet are concurrently processed.

12. The non-transitory computer-readable storage medium of claim 9, the program further executable to:
receive additional packets that are associated with the first flow;
identify that the additional packets are associated with the first flow;
assign one or more tag types and values to the additional packets, the one or more tag types and values identifying an order for processing the additional packets; and
process the additional packets according to the order for processing the additional packets.

13. The non-transitory computer-readable storage medium of claim 9, the program further executable to:
separate the identified first set of the received packets in the first flow from other received packets associated with at least one other flow;
assign one or more values to each of the packets from the at least one other flow, the one or more values associated with an order for processing the packets from the at least one other flow;
process a first portion of at least one packet of the packets from the at least one other flow;
identify that the at least one packet should be locked until another processing task associated with the at least one other flow has completed;
identify that the another processing task has completed; and
continue the processing of the at least one packet based on the identified completion of the another processing task.

14. The non-transitory computer-readable storage medium of claim 10, the program further executable to:
identify that at least a portion of a third packet and a portion of a fourth packet can be processed concurrently;
process the at least portion of the third packet and the portion of the fourth packet concurrently;
lock the processing of the third packet based on an identification that the third packet should be locked until another processing task associated with the first flow has completed;
identify that the another processing task has completed; and
continue the processing of the third packet based on the identified completion of the another processing task.

15. The non-transitory computer-readable storage medium of claim 9, the program further executable to:
store first set of program code in a local memory of a first processing core at the multi-processor system, the first set of program code executable to process a first set of processing tasks and not a second set of processing tasks; and
store the first set of program code and the second set of program code in a local memory of a second processing core at the multi-processor system, wherein a first set of processing tasks are processed at the first processing core based on the first set of program code stored in the local memory of the first processing core and wherein a second set of processing tasks are processed at the second processing core based on the second set of program code being stored in the local memory of the second processing core.

16. An apparatus for packet processing, the apparatus comprising:
one or more memories; and
one or more processors of a plurality of processors that execute instructions out of the one or more memories to:
identify that a first set of received packets belongs to a first flow of data packets based on one or more common properties across the first set of received packets,
assign a first tag type and a first value to each of a first packet and a second packet of the first set of received packets, the first tag type and the first value identifying data packets of the first set of received packets that can be processed concurrently;
process the first packet and the second packet concurrently based on the first packet and the second packet each being assigned the first tag type and the first value.

17. The apparatus of claim 16, wherein the one or more processors also execute instructions to:
assign a tag type and a value to each of the first set of received packets, wherein the first tag type and the first value identify data packets of the first set of received packets that can be processed concurrently, and
identify that the first packet and the second packet of the first set of received packets can be processed concurrently based on the first packet and the second packet having been assigned the first tag type and the first value.

18. The apparatus of claim 17, wherein the first packet is processed at a first processor of the plurality of processors and the second packet is processed at a second processor of the plurality of processors when the first packet and the second packet are concurrently processed.

19. The method of claim 17, wherein:
additional packets that are associated with the first flow are received,
the additional packets are identified as being associated with the first flow,
one or more tag types and values are assigned to the additional packets, the one or more tag types and values identifying an order for processing the additional packets, and
the additional packets are processed according to the order for processing the additional packets.

20. The apparatus of claim 16, wherein:
the one or more memories include a memory local to a first processor of the plurality of processors and a second memory local to a second processor of the one or more processors;
a first set of program code is stored in a local memory of a first processor, the first set of program code executable to process a first set of processing tasks and not a second set of processing tasks, and
the first set of program code and the second set of program code are stored in a local memory of a second processor of the one or more of processors.

* * * * *